United States Patent
Peachee et al.

(10) Patent No.: US 6,584,813 B2
(45) Date of Patent: Jul. 1, 2003

(54) WASHING MACHINE INCLUDING A SEGMENTED STATOR SWITCHED RELUCTANCE MOTOR

(75) Inventors: C. Theodore Peachee, St. Louis, MO (US); Donald J. Williams, Pierron, IL (US); Steven P. Randall, Leeds (GB)

(73) Assignee: Emerson Electric Co., St. Louis, MO (US)

( * ) Notice: Subject to any disclaimer, the term of this patent is extended or adjusted under 35 U.S.C. 154(b) by 67 days.

(21) Appl. No.: 09/817,687

(22) Filed: Mar. 26, 2001

(65) Prior Publication Data

US 2002/0134118 A1 Sep. 26, 2002

(51) Int. Cl.$^7$ ................................................ D06F 37/30
(52) U.S. Cl. ........................................... 68/23.6; 68/24
(58) Field of Search ............................ 68/12.02, 12.16, 68/23.6, 23.7, 24; 310/68 B, 166, 168, 180, 181, 198, 214, 216, 217, 254

(56) References Cited

U.S. PATENT DOCUMENTS

| | | | |
|---|---|---|---|
| 1,756,672 A | 4/1930 | Barr | |
| 2,688,103 A | 8/1954 | Sheldon | |

(List continued on next page.)

FOREIGN PATENT DOCUMENTS

| | | |
|---|---|---|
| DE | 2937838 A | 4/1981 |
| EP | 0350429 | 10/1990 |
| EP | 0823711 A1 | 2/1998 |
| EP | 0778660 A3 | 9/1998 |
| EP | 0868010 A1 | 9/1998 |
| EP | 0871282 A1 | 10/1998 |
| EP | 0967135 A2 | 12/1999 |
| FR | 2719324 | 3/1995 |
| GB | 1200279 | 7/1970 |
| JP | 61030938 | 2/1986 |
| JP | 404049826 A | 2/1992 |
| JP | 05-038086 | 2/1993 |
| JP | 08-033292 | 2/1996 |
| JP | 09084282 | 3/1997 |
| JP | 09-233742 | 9/1997 |
| JP | 09-322439 | 12/1997 |
| JP | 10-174319 | 6/1998 |
| JP | 10-210721 | 8/1998 |
| JP | 10-271718 | 10/1998 |
| JP | 11-018331 | 1/1999 |
| JP | 11-089129 | 3/1999 |
| JP | 11-191987 | 7/1999 |
| JP | 11-275830 | 10/1999 |
| JP | 11-289701 | 10/1999 |
| JP | 11-289726 | 10/1999 |

(List continued on next page.)

OTHER PUBLICATIONS

G. Gallegos–Lopez, P.C. Kjaer, T.J.E. Miller, "A New Rotor Position Estimation Method For Switched Reluctance Motors Using PWM Voltage Control", in Proc EPE'97, 7th European Conf. on Power Electronics and Applications Sep. 8–10, 1997 Trondheim Norway vol. 3 pp. 580–585.

(List continued on next page.)

Primary Examiner—Philip R. Coe
(74) Attorney, Agent, or Firm—Harness, Dickey & Pierce, P.L.C.

(57) ABSTRACT

A washing machine includes a tub that is rotated by a switched reluctance motor. The tub includes an outer tub and an inner tub. The drive is a direct drive or a drive assembly that includes a shaft, a belt and a spinner pulley connected to the tub. The switched reluctance motor includes a stator with a plurality of circumferentially-spaced stator segment assemblies. Winding wire is wound around a stator segment core of the stator segment assemblies. A rotor is connected to the shaft that drives the belt and rotates the spinner pulley. A drive circuit energizes the winding wire around the stator segment assemblies based on a rotational position of the rotor. End cap assemblies are connected to opposite axial ends of the stator segment core. The end cap assemblies define an annular channel for receiving the winding wire and for preventing winding creep.

31 Claims, 10 Drawing Sheets

U.S. PATENT DOCUMENTS

| | | |
|---|---|---|
| 3,604,222 A | 9/1971 | Sandkrug et al. |
| 3,914,859 A | 10/1975 | Pierson |
| 3,979,821 A | 9/1976 | Noodleman |
| 3,987,324 A | 10/1976 | Linkous |
| 4,130,770 A | 12/1978 | Wrobel |
| 4,149,309 A | 4/1979 | Mitsui |
| 4,340,829 A | 7/1982 | McCoy |
| 4,418,307 A | 11/1983 | Hoffmann et al. |
| 4,584,495 A | 4/1986 | Kordik |
| 4,698,542 A | 10/1987 | Muller |
| 4,772,839 A | 9/1988 | MacMinn et al. |
| 4,812,695 A | 3/1989 | Parshall |
| 4,819,460 A | 4/1989 | Obradovic |
| 4,845,837 A | 7/1989 | Lloyd |
| 4,883,982 A | 11/1989 | Forbes et al. |
| 4,896,089 A | 1/1990 | Kliman et al. |
| 4,922,165 A | 5/1990 | Crawford et al. |
| 4,950,932 A | 8/1990 | Harms et al. |
| 4,953,284 A | 9/1990 | Hammer et al. |
| 4,959,596 A | 9/1990 | MacMinn et al. |
| 4,998,052 A | 3/1991 | Erdman et al. |
| 5,034,642 A | 7/1991 | Hoemann et al. |
| 5,076,076 A | 12/1991 | Payne |
| 5,161,393 A | 11/1992 | Payne et al. |
| 5,173,650 A | 12/1992 | Hedlund |
| 5,194,775 A | 3/1993 | Cooper |
| 5,212,419 A | 5/1993 | Fisher et al. |
| 5,252,902 A | 10/1993 | Uehara et al. |
| 5,256,926 A | 10/1993 | Hagenlocher et al. |
| 5,257,828 A | 11/1993 | Miller et al. |
| 5,301,523 A | 4/1994 | Payne et al. |
| 5,325,677 A | 7/1994 | Payne et al. |
| 5,327,053 A | 7/1994 | Mann et al. |
| 5,457,375 A | 10/1995 | Marcinkiewicz et al. |
| 5,467,025 A | 11/1995 | Ray |
| 5,491,859 A | 2/1996 | Richardson |
| 5,563,463 A | 10/1996 | Stark |
| 5,578,880 A | 11/1996 | Lyons et al. |
| 5,583,387 A | 12/1996 | Takeuchi et al. |
| 5,589,751 A | 12/1996 | Lim |
| 5,672,925 A | 9/1997 | Lipo et al. |
| 5,701,064 A | 12/1997 | Horst et al. |
| 5,720,065 A | 2/1998 | Myers et al. |
| 5,729,072 A | 3/1998 | Hirano et al. |
| 5,740,880 A | 4/1998 | Miller |
| 5,743,721 A | 4/1998 | Graham et al. |
| 5,763,978 A | 6/1998 | Uchida et al. |
| 5,777,416 A | 7/1998 | Kolomeitsev |
| 5,786,651 A | 7/1998 | Suzuki |
| 5,793,179 A | 8/1998 | Watkins |
| 5,806,169 A | 9/1998 | Trago et al. |
| 5,811,905 A | 9/1998 | Tang |
| 5,821,661 A | 10/1998 | Wissmach et al. |
| 5,859,518 A | 1/1999 | Vitunic |
| 5,877,568 A * | 3/1999 | Maes et al. ............... 310/68 B |
| 5,883,485 A | 3/1999 | Mehlhorn |
| 5,923,141 A | 7/1999 | McHugh |
| 5,929,590 A | 7/1999 | Tang |
| 5,955,861 A | 9/1999 | Jeong et al. |
| 5,979,195 A | 11/1999 | Bestell et al. |
| 5,982,117 A | 11/1999 | Taylor et al. |
| 5,990,592 A | 11/1999 | Miura et al. |
| 5,994,804 A | 11/1999 | Grennan et al. |
| 5,996,379 A | 12/1999 | Skrippek |
| 6,011,368 A | 1/2000 | Kalpathi et al. |
| 6,020,661 A | 2/2000 | Trago et al. |
| 6,040,647 A | 3/2000 | Brown et al. |
| 6,041,625 A * | 3/2000 | Nagai et al. ............... 68/12.02 |
| 6,049,153 A | 4/2000 | Nishiyama et al. |
| 6,081,083 A | 6/2000 | Nashiki |
| 6,087,755 A | 7/2000 | Suzuki et al. |
| 6,092,619 A | 7/2000 | Nishikawa et al. |
| 6,102,151 A | 8/2000 | Shimizu et al. |
| 6,104,113 A * | 8/2000 | Beifus ...................... 310/68 B |
| 6,107,772 A | 8/2000 | Liu et al. |
| 6,122,579 A | 9/2000 | Collier-Hallman et al. |
| 6,127,753 A | 10/2000 | Yamazaki et al. |
| 6,144,131 A | 11/2000 | Hollenbeck et al. |
| 6,166,468 A | 12/2000 | Suzuki et al. |
| 6,177,751 B1 | 1/2001 | Suzuki et al. |
| 6,188,196 B1 | 2/2001 | Koide et al. |
| 6,194,805 B1 | 2/2001 | Heese et al. |
| 6,194,806 B1 | 2/2001 | Suzuki et al. |
| 6,204,579 B1 | 3/2001 | Arpino |
| 6,218,753 B1 | 4/2001 | Asano et al. |
| 6,219,900 B1 | 4/2001 | Suzuki |
| 6,226,856 B1 | 5/2001 | Kazama et al. |
| 6,239,530 B1 | 5/2001 | Garcia |
| 6,266,591 B1 | 7/2001 | Wilson-Jones et al. |
| 6,300,700 B1 | 10/2001 | Nishiyama et al. |
| 6,329,782 B1 | 12/2001 | Chen et al. |
| 6,359,412 B1 | 3/2002 | Heglund |
| 6,369,481 B1 | 4/2002 | Bahn |
| 6,369,687 B1 | 4/2002 | Akita et al. |
| 6,373,211 B1 | 4/2002 | Henry et al. |
| 2001/0010452 A1 | 8/2001 | Moriarty |
| 2001/0030517 A1 | 10/2001 | Batzel |
| 2002/0089251 A1 | 7/2002 | Tajima et al. |

FOREIGN PATENT DOCUMENTS

| | | |
|---|---|---|
| JP | 11-289727 | 10/1999 |
| JP | 11-289728 | 10/1999 |
| JP | 11-341717 | 10/1999 |
| JP | 11-332138 | 11/1999 |
| JP | 2000-014057 | 1/2000 |
| JP | 2000-37050 | 2/2000 |
| JP | 2000-139052 | 5/2000 |
| JP | 2000-312451 | 7/2000 |
| JP | 2000-224790 | 8/2000 |
| JP | 2000-333388 | 11/2000 |
| JP | 2001-008395 | 12/2001 |
| SU | 1354-338 A1 | 11/1987 |
| WO | WO 00/37731 | 6/2000 |
| WO | WO 00/79670 A1 | 12/2000 |
| WO | WO 01/95459 A1 | 12/2001 |

OTHER PUBLICATIONS

Stephenson/Blake, "The Characteristics, Design and Applications of Switched Reluctance Motors and Drives", presented at the PCIM '93 Conference and Exhibition at Nuremburg, Germany, Jun. 21–24, 1993.

T.J.E. Miller, "Switched Reluctance Motors and Their Control", Magna Physics Publishing and Claredon Press Oxford 1993.

WF Ray and IH Al–Bahadly, "Sensorless Methods for Determining the Rotor Position of Switched Reluctance Motors", published in the Proceedings of the European Power Electronics Conference, Brighton UK Sep. 13–16, 1993, vol. 6, pp. 7–13.

Anthony J. Champagne, "Correlation of Electric Power Steering Vibration to Subjective Ratings", SAE Technical Paper Series 2000–01–0176, Mar. 6–9, 2000, pp. 1–3.

Gallegos–Lopez/Kjaer/Miller, "A New Sensorless Method for Switched Reluctance Motor Drives", 1997, Department of Electronics and Electrical Engineering, pp. 564–570.

Mvungi/Stephenson, "Accurate Sensorless Rotor Position Detection In An SR Motor", 1991, pp. 76–79.

Roy McCann, "Variable Effort Steering for Vehicle Stability Enhancement Using an Electric Power Steering System", SAE Technical Paper Series 2000–01–0817, Mar. 6–9, 2000, pp. 1–5.

Toboldt/Johnson/Olive, "Goodheart–Willcox Automotive Encylopedia", 1989, pp. 577–584.

* cited by examiner

WASHING MACHINE INCLUDING A SEGMENTED STATOR SWITCHED RELUCTANCE MOTOR

FIELD OF THE INVENTION

This invention relates to washing machines and, more particularly, to washing machines including switched reluctance motors.

BACKGROUND OF THE INVENTION

Consumers who purchase washing machines for laundering clothing have become more sophisticated. Consumers expect a washing machine to operate quietly and efficiently. The washing machine must be reliable and have little or no maintenance costs. The washing machine preferably has a high capacity to size ratio. In other words, consumers would like the ability to launder a large amount of clothing in a small amount of time without needing a large, commercial-sized washing machine. Consumers also expect the washing machine to be gentle on their clothing.

Both vertical axis and horizontal axis washing machines are currently available in the marketplace. Vertical axis washing machines include a washing tub with an axis that is substantially vertical or at a slight angle with respect to vertical. In contrast, horizontal axis washing machines include a washing tub with an axis that is substantially horizontal or at a slight angle with respect to horizontal.

Due to significant improvements in recent years, the demand for horizontal axis washing machines is on the rise. Horizontal axis washing machines typically utilize less power and a reduced amount of water and/or detergent than vertical axis washing machines. Therefore, the operating costs that are associated with horizontal axis washing machines are typically lower than with vertical axis washing machines. In addition, the more efficient tumbling action that is imparted to clothing in a horizontal axis washing machine generally provides improved stain removal and/or a shorter washing cycle that is more gentle on clothing.

While there are significant structural differences between these two types of washing machines, both generally include a cabinet shell and a tub assembly. The tub assembly includes an outer tub that is suspended in the cabinet shell and an inner tub that is rotatably mounted within the outer tub. The inner tub typically includes fins that project radially inwardly from the annular side wall of the inner tub. The fins impart movement to the washing fluid and the articles of clothing that are located in the inner tub. Annular side walls of the inner and outer tubs are concentric. A pivotable door that is secured to the cabinet shell provides access to the inner tub to load or unload laundry. In vertical washing machines, the pivotable door is typically located on the top side of the cabinet shell. In horizontal washing machines, the pivotable door is typically located on the front side of the cabinet shell.

In operation, clothes are loaded into the inner tub. A mixture of water, detergent and/or other washing fluids is pumped into the inner tub. A motor rotates a drive assembly that, in turn, rotates the inner tub typically using a reciprocal or rotational movement. The reciprocal and/or rotational movement cleans the clothes. As can be appreciated, the motor of the washing machine has a significant impact on the capacity, reliability, efficiency operating noise and other operating characteristics of the washing machine. Improvements that are made to the motor will help manufacturers meet or exceed consumer demands for these product features.

Reluctance motors have typically been used in washing machines. Reluctance motors produce torque as a result of the rotor tending to rotate to a position that maximizes the inductance of an energized winding of the stator. A drive circuit generates a set of stator winding currents that are output to the stator pole windings and that set up a magnetic field. In response to the magnetic field, the rotor also rotates in an attempt to minimize the reluctance of the magnetic circuit (and to maximize the inductance of the energized winding of the stator). In synchronous reluctance motors, the windings are energized at a controlled frequency. In switched reluctance motors, control circuitry and/or transducers are provided for detecting the angular position of the rotor. A drive circuit energizes the stator windings as a function of the sensed rotor position. The design and operation of switched reluctance motors is known in the art and is discussed in T. J. E. Miller, "Switched Reluctance Electric Motors and Their Control", Magna Physics publishing and Clarendon Press, Oxford, 1993, which is hereby incorporated by reference.

In switched reluctance motors, there are two distinct approaches for detecting the angular rotor position. In a "sensed" approach, an external physical sensor senses the angular position of the rotor. For example, a rotor position tranducer (RPT) with a hall effect sensor or an optical sensor physically senses the angular position of the rotor. In a "sensorless" approach, electronics that are associated with the drive circuit derive the angular rotor position without an external physical sensor. Angular rotor position can be derived by measuring the back electromotive force (EMF) or inductance in unenergized windings, by introducing diagnostic pulses into energized and/or unenergized windings and sensing the resulting electrical response, or by sensing other electrical parameters and deriving the angular position of the rotor.

The stator of conventional switched reluctance motors generally includes a solid stator core or a laminated stator with a plurality of circular stator plates. The stator plates are punched from a magnetically conducting material and are stacked together. The solid core or the stack of stator plates define salient stator poles that project radially inward and inter-polar slots that are located between the adjacent stator poles. Winding wire is wound around the stator poles. Increasing the number of winding turns and the slot fill increases the torque density of the electric machine. The stator poles of switched reluctance motors typically have parallel sides that do not inherently hold the winding wire in position. Tangs on radially inner ends of the stator poles have been provided to help maintain the winding wire on the stator poles with some limited success. Tangs limit an area between radially inner ends of the stator poles, which may cause problems during the winding process.

In switched reluctance motors using the "sensed" approach, a rotor position transducer ("RPT") is used to detect the angular position of the rotor with respect to the stator. The RPT provides an angular position signal to the drive circuit that energizes the windings of the switched reluctance motor. The RPT typically includes a sensor board with one or more sensors and a shutter that is coupled to and rotates with the shaft of the rotor. The shutter includes a plurality of shutter teeth that pass through optical sensors as the rotor rotates.

Because rotor position information is critical to proper operation of a switched reluctance motor, sophisticated alignment techniques are used to ensure that the sensor board of the RPT is properly positioned with respect to the housing and the stator. Misalignment of the sensor board is known to degrade the performance of the electric motor. Unfortunately, utilization of these complex alignment techniques increases the manufacturing costs for switched reluctance motors equipped with RPTs.

The RPTs also increase the overall size of the switched reluctance motor, which can adversely impact motor and product packaging requirements. The costs of the RPTs often place switched reluctance motors at a competitive disadvantage in applications that are suitable for open-loop induction electric motors that do not require RPTs.

Another drawback with RPTs involves field servicing of the switched reluctance motors. Specifically, wear elements, such as the bearings, located within the enclosed rotor housing may need to be repaired or replaced. To reach the wear elements, an end shield must be removed from the housing. Because alignment of the sensor board is critical, replacement of the end shield often requires the use of complex realignment techniques. When the service technician improperly performs the alignment techniques, the motor's performance is adversely impacted.

In an effort to eliminate the RPTs and to reduce manufacturing costs and misalignment problems, the "sensorless" approach for sensing rotor position is used. The various methods of performing the "sensorless" approach have drawbacks that are attributable, in part, to variations in the inductance and resistance of the stator windings due to assembly and tolerance variations.

Washing machines incorporating switched reluctance motors can be improved in several important areas. Specifically, it is desirable to improve the torque density of switched reluctance motors that are used in washing machines. By increasing the torque density of the motor, the size of the motor can be reduced for a given torque density and/or the size can be maintained with an increase in torque density. As a result, the size of the inner and outer tubs can be increased for a given application and/or the size of the washing machine can be reduced for a given capacity.

It is also desirable to eliminate the need for RPTs in switched reluctance motors that are used in washing machines. It is also desirable to assemble the stator of a switched reluctance motor in a highly uniform and repeatable manner to improve the performance of sensorless switched reluctance motors by reducing variations in the inductance and resistance of the stator. As a result, the "sensorless" methods of sensing rotor position will be improved.

SUMMARY OF THE INVENTION

A washing machine according to the invention includes a tub that is rotated by a switched reluctance motor. The switched reluctance motor includes a shaft that rotates the tub. The switched reluctance motor includes a stator with a plurality of circumferentially-spaced stator segment assemblies each with a stator segment core. Winding wire is wound around the stator segment core. A rotor is connected to the shaft and defines a plurality of rotor poles. The rotor tends to rotate relative to the stator to maximize the inductance of an energized winding. A drive circuit energizes the winding wire around the stator segment assemblies based on a rotational position of the rotor.

In other features of the invention, the switched reluctance motor directly drives the tub. The rotor is connected to a shaft that is connected to the tub. Alternately, the switched reluctance motor is connected to a drive assembly that includes a spinner pulley that is connected to the tub. The spinner pulley is rotated by a belt that is driven by the shaft that is connected to the rotor. The tub assembly includes an outer tub and an inner tub that is mounted for rotation concentrically in the outer tub.

According to other features of the invention, each stator plate has an outer rim section and a tooth-shaped pole section. The end cap assembly includes a pair of end caps that are secured to opposite ends of the stator segment core and a pair of retainer sections interconnecting the end caps on opposite sides of the stator segment core. The end cap assembly defines an annular retention channel within which the winding wire is wound. The retention channel facilitates improved precision in the winding process and tends to reduce winding creep during use.

The washing machine according to the present invention includes the switched reluctance motor with improved torque density. The torque output of the switched reluctance motor can be increased for increased washing capacity. Alternatively the motor dimensions can be reduced for a given washing capacity to reduce the weight and the dimensions of the washing machine. In addition, the stator segment assemblies can be manufactured with greater uniformity and with lower variations in inductance and resistance. As a result, sensorless rotor position sensing techniques can be employed more readily, which dramatically lowers the manufacturing costs of the switched reluctance motor and improves the reliability of the motor in the field.

Other objects, features and advantages will be apparent from the specification, the claims and the drawings.

DETAILED DESCRIPTION OF THE PREFERRED EMBODIMENTS

The following detailed description provides preferred exemplary embodiments only and is not intended to limit the scope, applicability or configuration of the present invention. Rather, the detailed description of the preferred exemplary embodiments will provide those skilled in the art with an enabling description for implementing the preferred exemplary embodiments of the present invention. It will be understood that various changes may be made in the function and arrangement of the elements without departing from the spirit and scope of the invention as set forth in the appended claims.

A washing machine according to the present invention includes a novel switched reluctance motor with a segmented stator. The washing machine can be a vertical axis washing machine, a horizontal axis washing machine or any other suitable axis configuration. The washing machine with the switched reluctance motor can be packaged in a smaller size for a given torque output and/or packaged with the same size with increase torque output. The efficiency of the washing machine can be improved through an increased inner and outer tub size that can handle additional articles of clothing. Alternately, the size of the washing machine can be reduced for a given capacity. The novel segmented stator switched reluctance motor can also be implemented using sensorless rotor position techniques while remaining cost competitive with other types of motors.

Figure 1A:
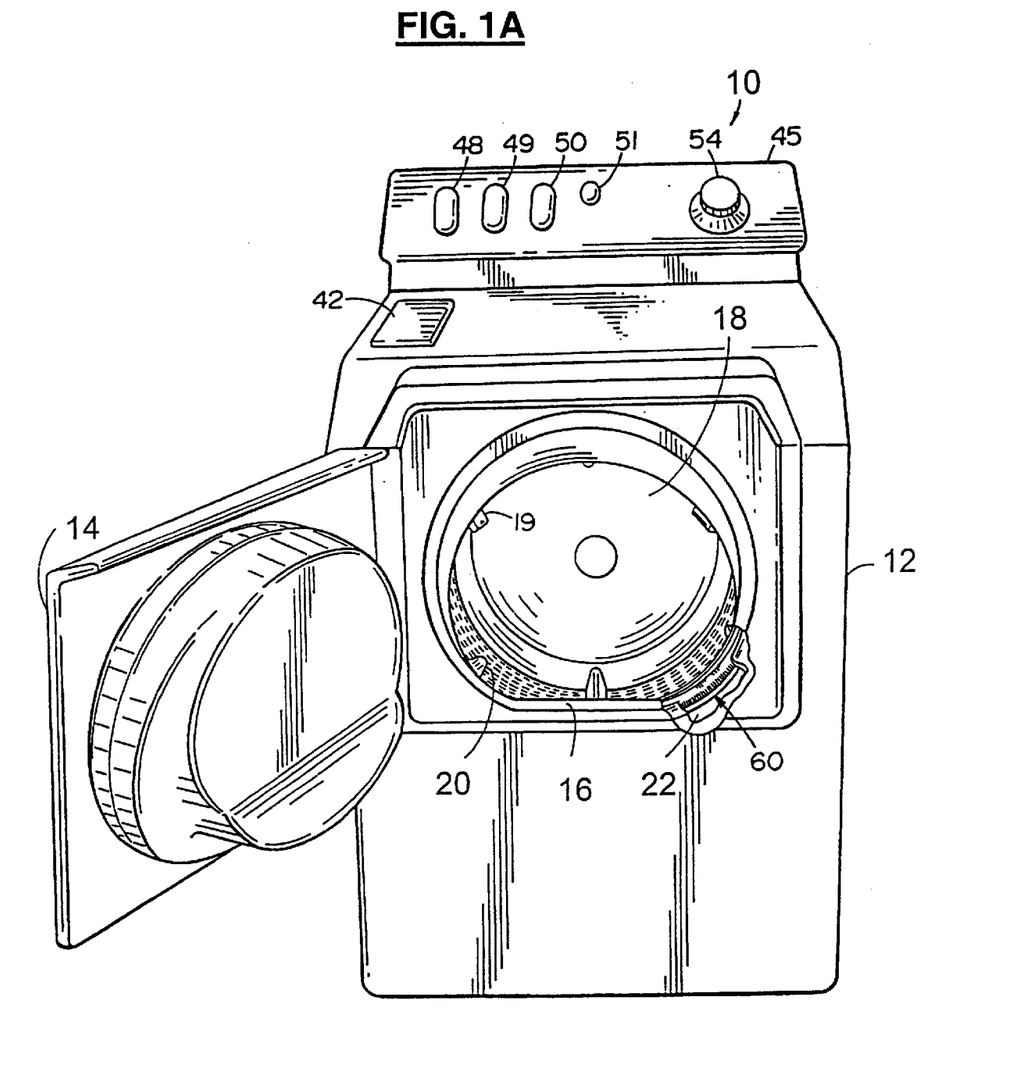
FIG. 1A is a front view of a horizontal tub washing machine.
Figure 2:
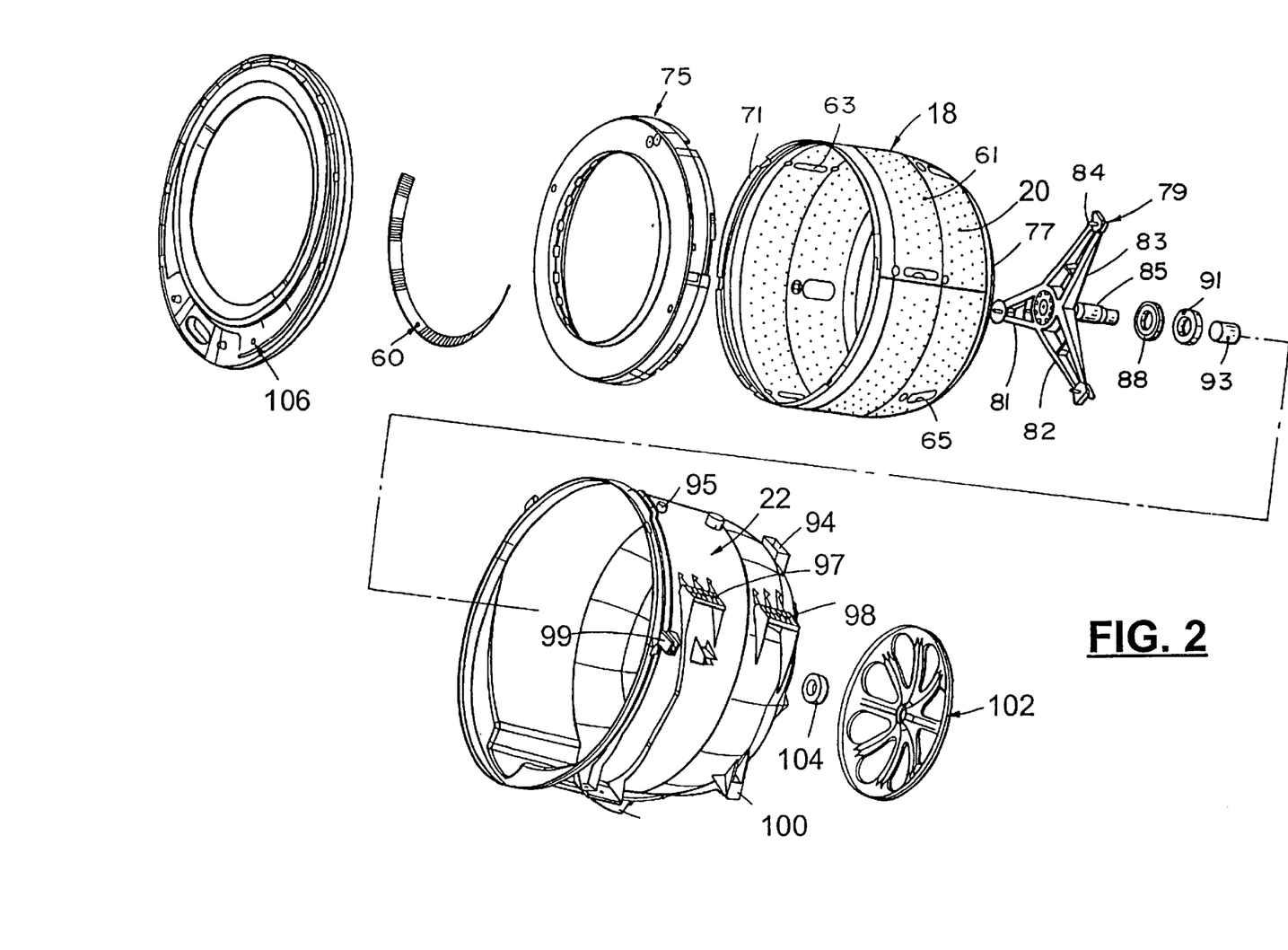
FIG. 2 is an assembly view of a tub assembly of the washing machine of FIG. 1A.

With initial reference to FIGS. 1A and 2, an exemplary horizontal axis washing machine is generally indicated at 10. The washing machine 10 is front loaded with clothing that is to be laundered through a tumble-type washing operation. The washing machine 10 incorporates an outer cabinet shell 12 that includes a front door 14 that extends across an access opening 16. The front door 14 can be selectively pivoted to provide access to a tub assembly that includes an inner tub 18.

Figure 1B:
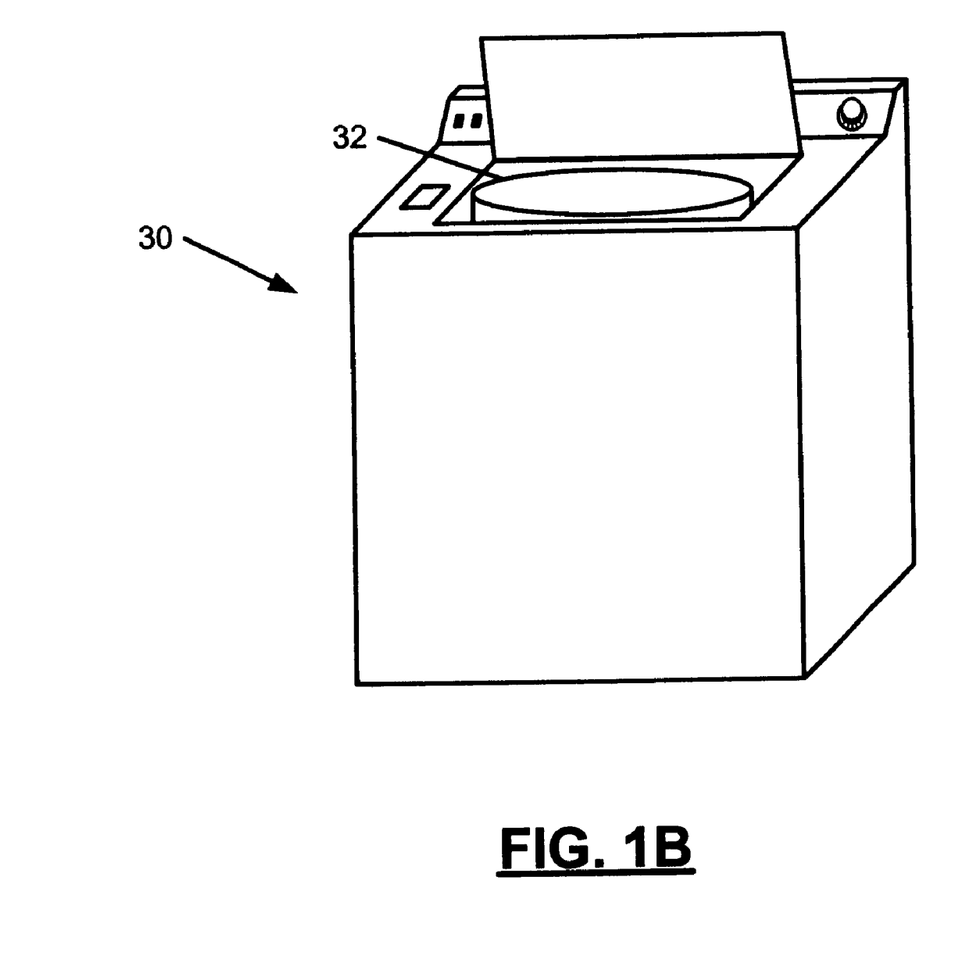
FIG. 1B is a front view of a vertical tub washing machine.

The inner tub 18 includes a plurality of holes 20 and a plurality of radially inwardly projecting fins 19 that are fixedly secured to the inner tub 18. The inner tub 18 is mounted for rotation inside an outer tub 22 that is also part of the tub assembly. The outer tub 22 is supported through a suspension mechanism (not shown in FIGS. 1 and 2) within the outer cabinet shell 12. The inner tub 18 is mounted within the outer cabinet shell 12 and the outer tub 22 for rotation about a generally horizontal axis. The rotational axis is angled slightly with respect to horizontal. Referring now to FIG. 1B, the present invention also has application to washing machines 30 with tub assemblies 32 with a vertical axis, a substantially vertical axis or other axis configurations with direct drive or other drive systems.

Although not shown in FIGS. 1A and 2, a motor is mounted within the outer cabinet shell 12 and rotates the inner tub 18 inside the stationary outer tub 22. The motor is a variable speed, reversible switched reluctance motor. The inner tub 18 is rotated during both wash and rinse cycles such that the articles of clothing placed therein tumble through water, detergent, and/or other washing fluids that are supplied to the inner tub 18. Because the inner tub 18 includes the holes 15, the washing fluid flows between the inner tub 18 and the outer tub 22. A pumping system (not shown) is provided to control the availability of washing fluid within the washing machine 10.

The washing machine 10 is also shown to include an upper cover 42 that provides access for adding detergent, softeners and other washing machine related fluids. In addition, an upper control panel 45, including various selector buttons 48–51 and a control knob 54, allows a user to set a desired washing operation.

In order to allow the inner tub 18 to freely rotate within the outer tub 22 during a the washing operation, the inner tub 18 is spaced concentrically within the outer tub 22 in a manner that will be detailed more fully below. The spaced relationship establishes an annular gap between the inner tub 18 and the outer tub 22.

The inner tub 18 has an annular side wall 61 that is formed with various circumferentially spaced forward slots 63 and rear slots 65. The slots 63 and 65 and the holes 20 permit washing fluid to flow into the inner tub 18 during a washing operation. The radially projecting fins 19 are secured over some of the slots 63 and 65. The radially projecting fins 19 include openings for permitting the washing fluid to be injected into the inner tub 18. The inner tub 18 also includes an open front rim 71 that is connected to a balance ring 75.

The inner tub 18 also includes a rear wall 77 that is secured to a spinner support 79. The spinner support 79 includes a plurality of radially extending arms 81, 82 and 83 that are secured to rear wall 77 by screws 84 or other conventional fastening techniques. The spinner support 79 and an annular lip seal 88 are connected to a driveshaft 85. A first bearing unit 91 is press-fit onto the driveshaft 85. A bearing spacer 93 is also inserted over the driveshaft 85.

The outer tub 22 includes one or more fluid inlet ports 94 and 95 that are preferably located on an upper portion thereof. One or more fluid drain ports 96 are preferably located on a lower portion of the outer tub 22. The fluid inlet and drain ports 94, 95 and 96 are used to control the level of fluid within the tub assembly. Balance weight mounting platforms 97 and 98, mounting surface 99 and a mounting boss 100 are utilized in mounting the outer tub 22 in a suspended fashion. A spinner pulley 102 provides an arcuate outer surface that engages a belt that is driven by the switched reluctance motor. The spinner pulley 102 is fixed for rotation with the inner tub 18. A second bearing unit 104 rotatably mounts the spinner pulley 102 to the outer tub 22.

Figure 3:
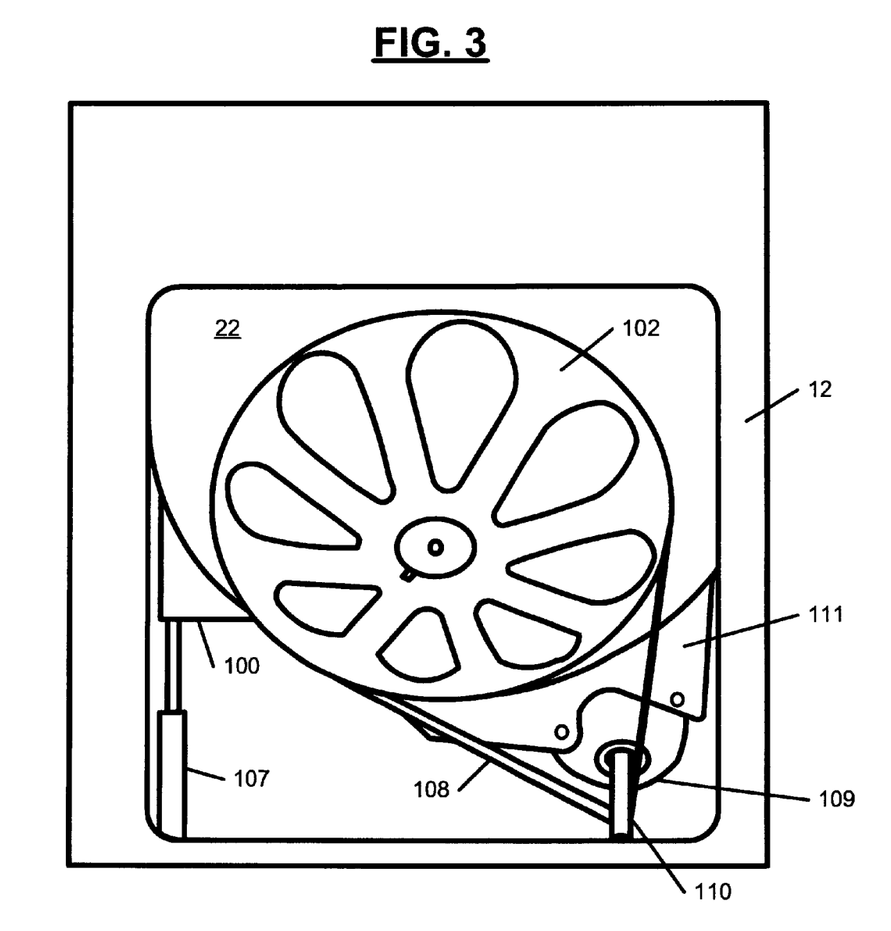
FIG. 3 is a rear view of the washing machine of FIG. 1A that illustrates a drive assembly, an outer tub and a switched reluctance motor according to the present invention.

Referring now to FIG. 3, one or more shock absorbers 103 are attached to the outer tub 22. A piston of the shock absorber 103 is attached to the mounting boss 100. A belt drive assembly 104 includes a belt 108, a switched reluctance motor 109, a shaft 110, and the spinner pulley 102. The belt 108 is wound around a radially outer circumference of the spinner pulley 102. The switched reluctance motor 109 includes the shaft 110 that rotates the belt 108. The switched reluctance motor 109 is mounted on a lower portion of the outer tub 22 using fasteners and a mounting surface that are both generally identified at 111. While the drive assembly shown in FIGS. 2 and 3 is a belt drive system, direct drive systems can also be employed. In such systems, the rotor is connected to a shaft that is connected to the tub assembly. Examples of direct drive systems are shown in U.S. Pat. No. 5,720,065 to Myers et al., U.S. Pat. No. 5,325,677 to Payne et al., and U.S. Pat. No. 4,819,460 to Obradovic, which are hereby incorporated by reference. Other conventional drive systems may also be employed.

Referring now to FIGS. 4–10, the switched reluctance motor 109 is shown to include a housing 112, a segmented stator 114 mounted in the housing 112, and a rotor 116 that is supported for rotation relative to the segmented stator 114. In accordance with the present invention, the segmented stator 114 includes a plurality of stator segment assemblies 118 that can be individually assembled and subsequently combined with other stator segment assemblies to provide the segmented stator 114. As will be detailed, each stator segment assembly 118 includes a stator segment core 120, an end cap assembly 122 attached to the stator segment core 120, and winding wire 124 that is wound around the stator segment core 120 and the end cap assembly 122.

Referring primarily to FIGS. 4–7, the stator segment core 120 includes a solid core and/or a stack of individual stator plates 126. Each stator plate 126 includes an arcuate outer rim section 128 and a tooth-shaped pole section 130. An outer edge surface 132 of the outer rim section 128 is shaped for mounting to an inner wall surface 134 of the housing 112. Each outer rim section 128 has a tongue projection 136 formed on one edge surface 138 and a groove 140 on its opposite edge surface 142. This tongue and groove arrangement helps align the stator segment assemblies during manufacturing. The tongue and groove arrangement can be omitted since the press fit operation generally provides sufficient alignment. Each pole section 130 of the stator plates 126 has an arcuate inner edge surface 144 and a pair of circumferentially-extending projections 146 or tangs.

Figure 5A:
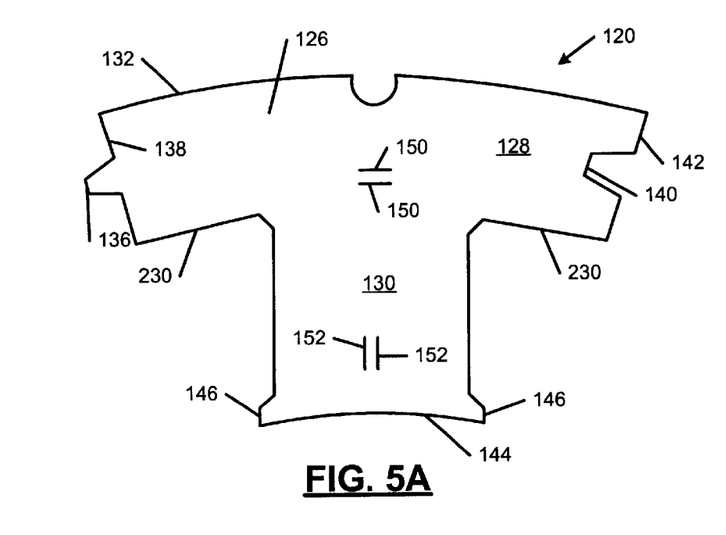
FIG. 5A illustrates a stator plate.

As previously mentioned, the stator segment core 120 is defined by a plurality of stator plates 126 that are stacked together. The stator plates 126 are die cut from thin sheets of magnetically conductive material. During the die cutting operation, a first pair of slits 150 are cut into the outer rim section 128 and a second pair of slits 152 are cut into the pole section 130 and central portions between the slits 150 and 152 are deformed. The slits 150 are transverse in alignment relative to the slits 152. After stacking the stator plates 126 that form the stator segment core 120, a press fit operation is completed to releasably interconnect the stator plates 126 and to define the stator segment core 120.

Figure 4:
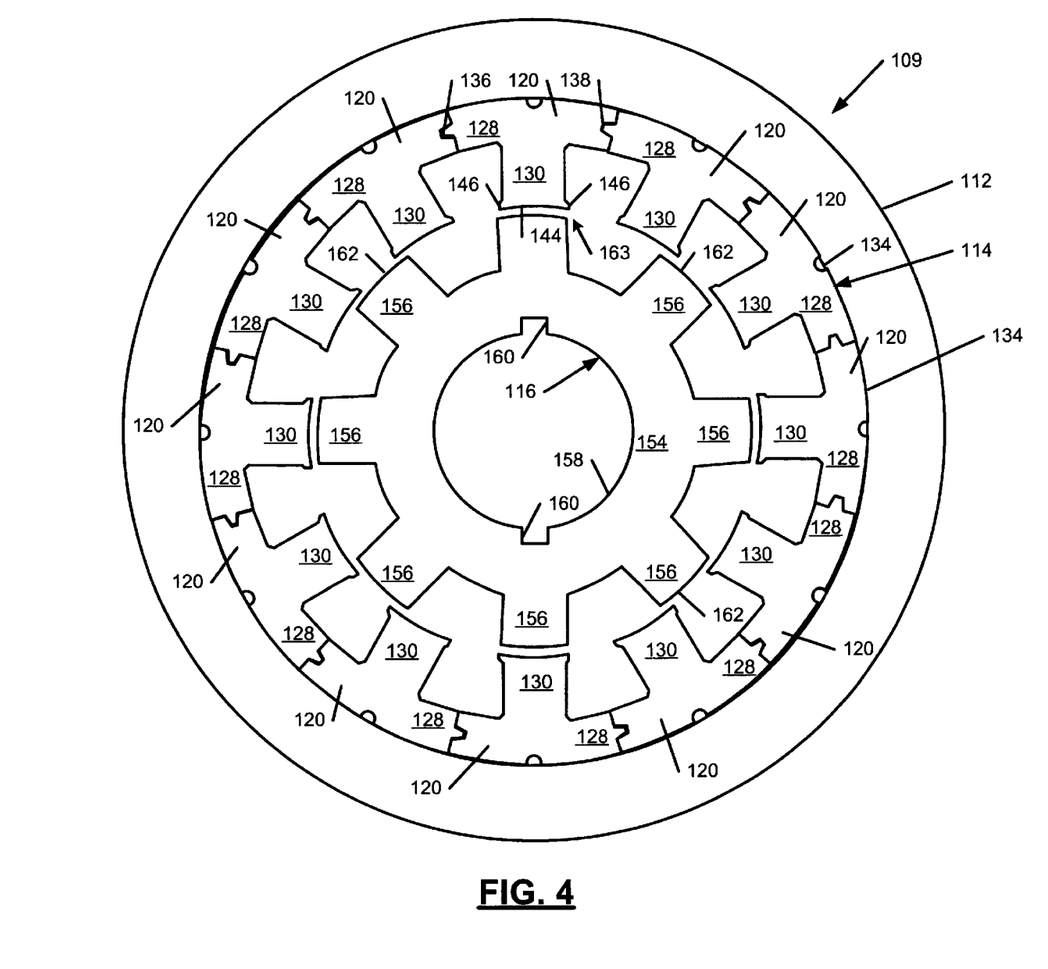
FIG. 4 illustrates a segmented stator and rotor for a switched reluctance motor.

The rotor 116 is shown to include a circular rim section 154 and a plurality of tooth-shaped pole sections 156 that project radially from the rim section 154. A circular bore 158 is formed in the rotor 116 and includes keyways 160. A rotor shaft (not shown) is received by the circular bore 158 of the rotor 116. In the particular embodiment shown, the rotor 116 has eight equally-spaced rotor pole sections 156 and the segmented stator 114 has twelve equally-spaced pole sections 130. Other rotor pole and stator pole combinations are also contemplated. In addition, each rotor pole section 156 has an arcuate outer edge surface 162 that defines an air gap 163 with respect to the arcuate inner edge surface 144 on the pole sections 130 of the stator plates 126.

Figure 7:
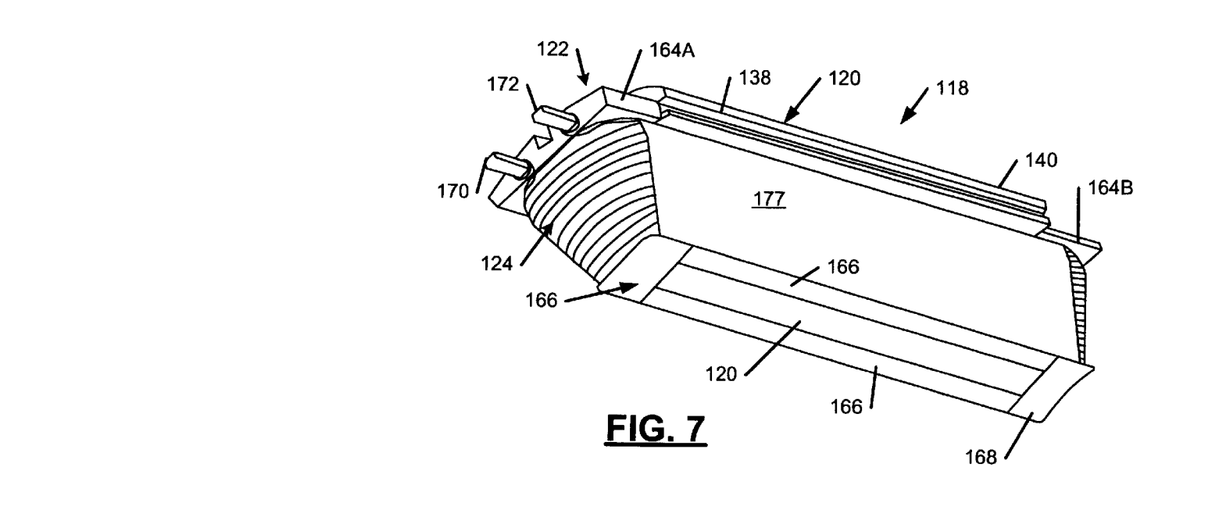
FIG. 7 is a perspective view of a stator segment assembly associated with the stator.

The stator segment assembly 118 is shown fully assembled to include the stator segment core 120, the end cap assembly 122 and the winding wire 124. The end cap assembly 122 is preferably made from magnetically permeable material and includes a first end cap 164A, a second end cap 164B and a pair of elongated winding retainer sections 166. The first end cap 164A is located at one end of the stator segment core 120 and the second end cap 164B is located at the opposite end of the stator segment core 120. The winding retainer sections 166 interconnect the first and second end caps 164A and 164B and are located adjacent to the projections 146 near the radially inner end of the pole sections 130 of the stator plates 126. Preferably, the end caps 164A and 164B are similar in configuration. Likewise, it is preferable that the retainer sections 166 are similar in configuration. Snap-in connections are contemplated for connecting the opposite ends of each retainer section 166 to the end caps 164A and 164B. Additionally, it is contemplated that adhesives are used for bonding the end caps 164A and 164B to the opposite ends of the stator segment core 120. The end caps 164A and 164B and the retainer sections 166 can also be molded as an integral end cap assembly 122. Since the first end cap 164A is similar to the second end cap 164B, the following description of the components will use reference numerals with an "A" suffix for the first end cap 164A and the reference numerals for similar components of the second end cap 164B will be identical with a "B" suffix.

Figure 5B:
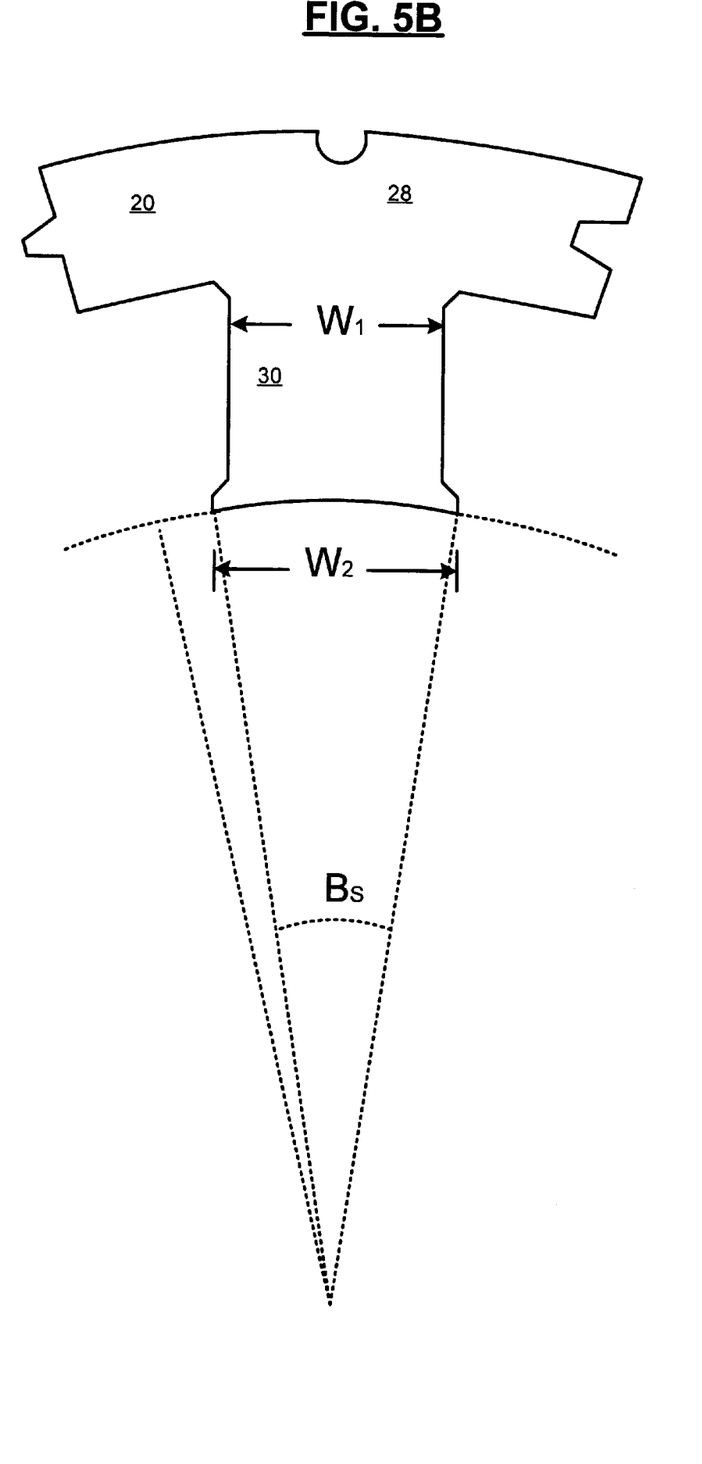
FIG. 5B identifies tooth width, projection width and stator pole arc on the stator plate of FIG. 5A.

Referring to FIG. 5B, tooth width W1, projection width W2, and stator pole arc Bs are shown. As a result of segmenting the stator, the designer of the switched reluctance electric machine has greater flexibility in designing the dimensions of the stator segment assemblies. The slot opening dimension between radially inner ends of the stator teeth restricts the projection width W2 when needle and transfer winding methods are employed. This restriction is eliminated when the segmented stator assemblies are employed because the stator teeth can be wound individually before being assembled into the stator.

The tooth width W1 determines the magnetic flux density in the stator tooth and how much area is available for winding wire in the inter-polar stator slot. The designer of the switched reluctance electric machine can select the tooth width W1 so that it is sufficient to accommodate the maximum anticipated magnetic flux in the stator poles, but is not wider than necessary. By optimizing the tooth width W1, the slot area is increased, which allows additional winding wire. By increasing the current carrying capacity of the windings without causing overheating, the torque density of the switched reluctance electric machine can be improved. The design of the stator plates also depends on other factors such as the type of steel that is selected, the axial length of the stator stack, the operating speed, the overall size of the motor, and the desired magnetic flux density in the stator teeth.

Figure 6:
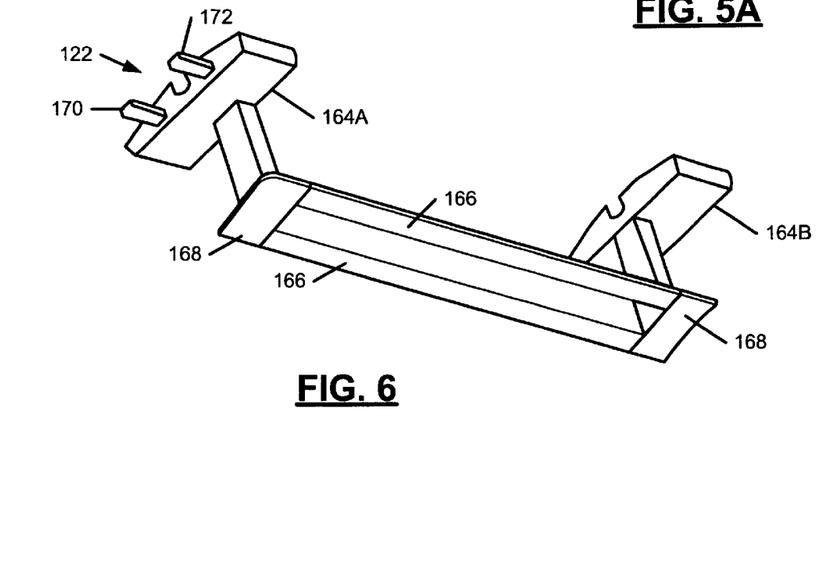
FIG. 6 is a perspective view of an end cap assembly.
Figures 9A, 9B, 9C:
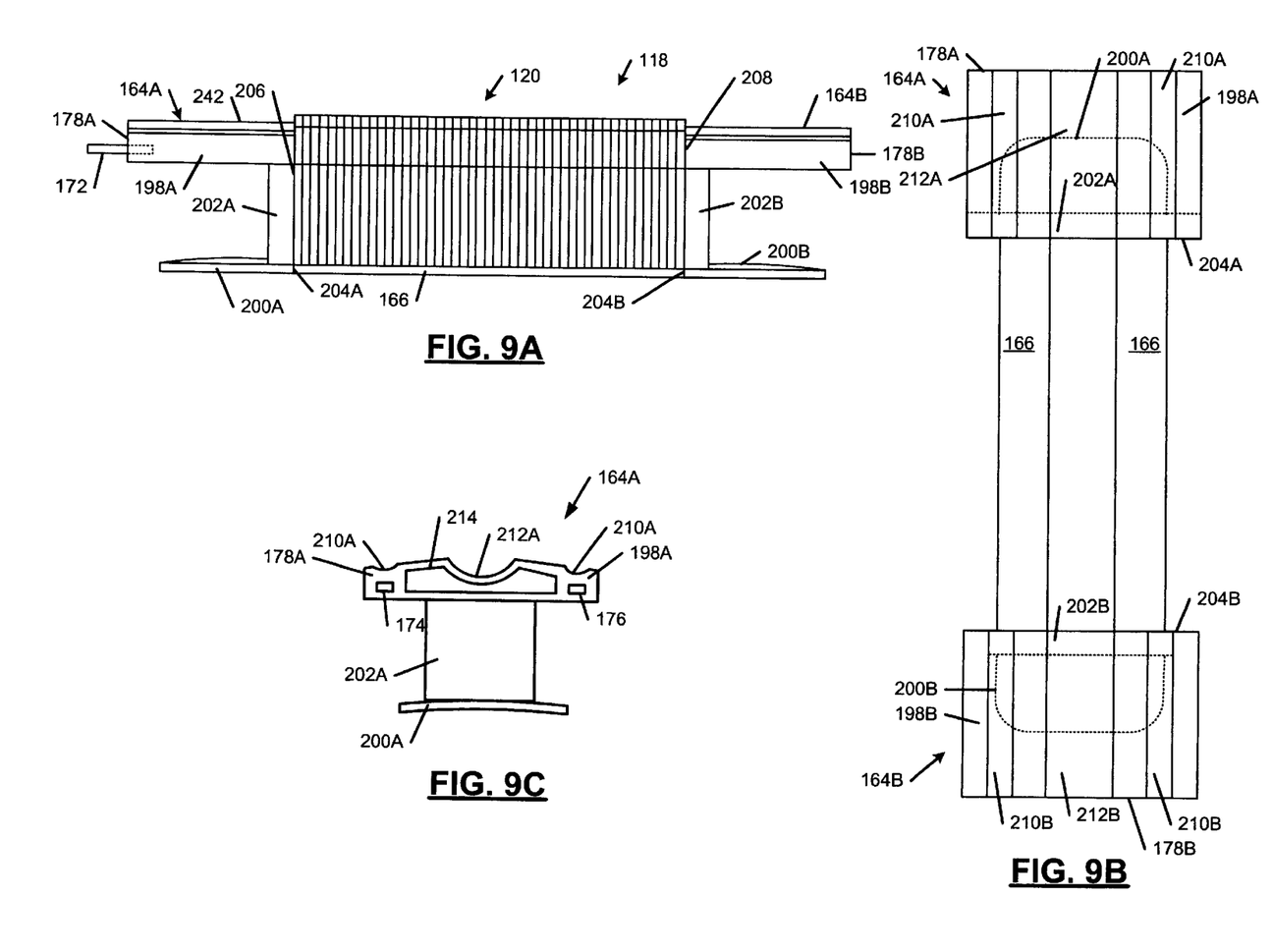
FIG. 9A shows the stator segment assembly with its wire windings and insulation removed to better illustrate a stack of stator plates and the end cap assembly.
FIG. 9B is a plan view of the end cap assembly shown in FIG. 9A.
FIG. 9C is an end view of the end cap assembly shown in FIG. 9B.

Terminals 170 and 172 are shown in FIGS. 6, 7 and 9A to be mounted in slots 174 and 176 (FIG. 9C) formed in an end surface 178A of the first end cap 164A. One end of the winding wire 124 is connected to the first terminal 170 while an opposite end of the winding wire 124 is connected to the second terminal 172. Insulating material 177 is shown to be positioned to cover winding wire 124 on both lateral sides of the stator segment core 120. The insulating material 177 is also positioned (but not shown) between the stator segment core 120 and the winding wire 124.

Figure 8:
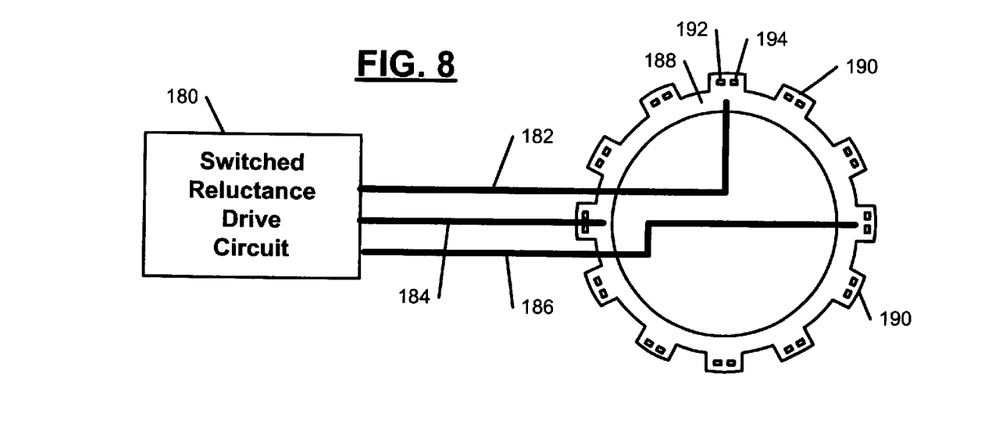
FIG. 8 illustrates a switched reluctance drive circuit and a circuit board for connecting the drive circuit to terminals of the stator segment assemblies.

Referring to FIG. 8, a switched reluctance drive circuit 180 is shown connected via connecting wires 182, 184 and 186 to a printed circuit board 188. The printed circuit board 188 is generally circular and has a plurality of radially outwardly projecting terminal pads 190. Each terminal pad 190 has conductive terminal slots 192 and 194 arranged to accept installation of the terminals 170 and 172 for each stator segment assembly 118. The drive circuit 180 operates to control energization of the winding wire 124 of the stator segment assemblies 118. In a preferred embodiment, the switched reluctance drive circuit 180 senses rotor position using sensorless techniques that are disclosed in U.S. Pat. No. 5,929,590 to Tang and U.S. Pat. No. 5,877,568 to Maes, et al., which are hereby incorporated by reference, or using any other conventional sensorless techniques.

To more clearly illustrate the structure of the end cap assembly 122, FIG. 9A shows the stator segment assembly 118 prior to the winding wire 124 being wound thereon. The first end cap 164A includes an outer section 198A and an inner section 200A interconnected by a hub section 202A, all defining a common face surface 204A. The face surface 204A abuts and is bonded to an axial end surface 206 of the stator segment core 120. Similarly, the face surface 204B of second end cap 164B abuts and is bonded to an end surface 208 of the stator segment core 120. When the first end cap 164A is secured to the stator segment core 120, its outer section 198A extends slightly radially inward with respect to the outer rim section 128 and is parallel to the outer rim section 128. The hub section 202A is aligned with pole section 130 and the inner section 200A is aligned with and extends laterally beyond the inner edge surface 144 and the projections 146. A similar alignment is provided when the second end cap 164B is secured to the opposite end surface 208 of the stator segment core 120. Moreover, the width of hub sections 202A and 202B is less than or equal to the width of the pole sections 130 of the stator segment core 120. The opposite ends of the retainer sections 166 are connected to the face surfaces 204A and 204B of the end caps 164A and 164B, respectively, adjacent to their inner sections 200A and 200B. As such, the end cap assembly 122 defines a continuous annular channel within which the winding wire 124 can be precisely installed and maintained.

FIG. 9B shows the inner section 200A of the first end cap 164A and the inner section 200B of the second end cap 164B to be rectangular in shape. It is contemplated, however, that other configurations (i.e. semi-circular, square, tapered, etc.) could be used. As a further option, the retainer sections 166 could be provided as a cantilevered section that is integrally formed with the end caps 164A and/or 164B and adapted for connection to the inner section of the opposite end cap. To reduce the weight of the end cap assembly 122, lateral axial grooves 210 and a central axial groove 212 can be formed on the outer section of the end caps 164A and 164B. Likewise, a cavity 214 can also be formed to provide additional weight reduction.

Figure 10A:
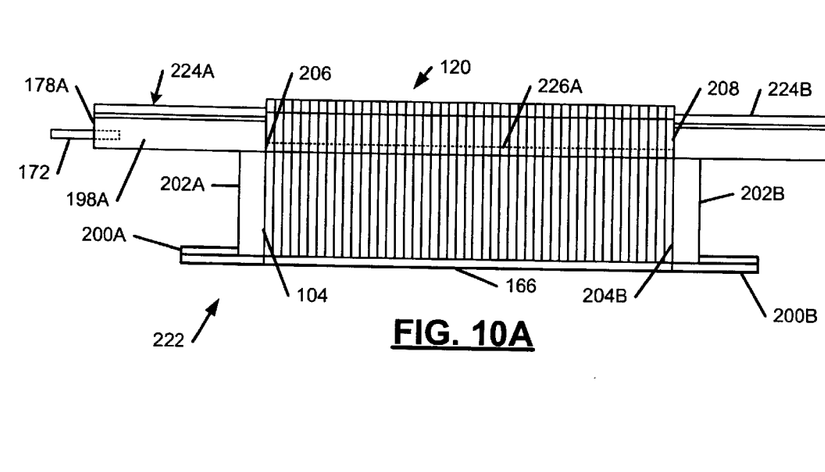
FIG. 10A is similar to FIG. 9A except that an alternate end cap assembly is shown.
Figure 10B:
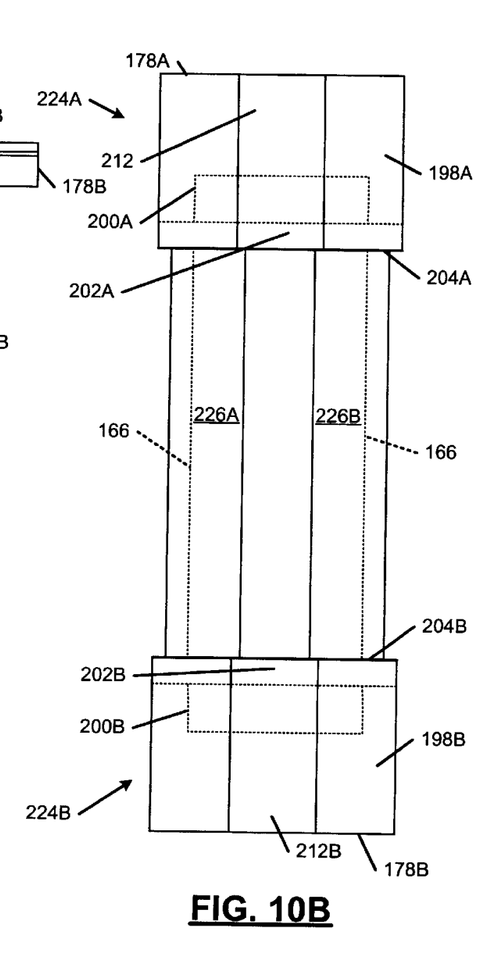
FIG. 10B shows a plan view of the alternate end cap assembly of FIG. 10A.
Figure 10C:
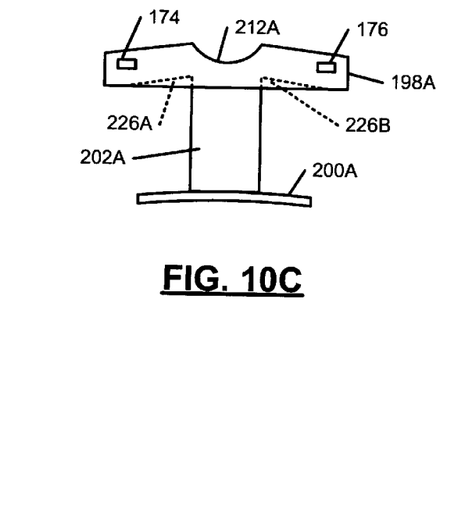
FIG. 10C illustrates an end view of the alternate end cap assembly shown in FIG. 10B.

Referring now to FIGS. 10A, 10B and 10C, an alternative cap assembly 222 is shown for connection to the stator segment core 120 and supporting the winding wire 124. Reference numerals from FIGS. 9A, 9B and 9C will be used where appropriate to identify similar elements. Specifically, the first end cap 224A is generally similar to the first end cap 164A. The alternative end cap assembly 222 includes an additional pair of retainer sections. An outer retainer section 226A extends axially from the common face surface 204A adjacent to the outer section 198A for connection to the outer section 198B of the second end cap 224B. An outer retainer section 226B likewise extends axially from its common face surface 204B for connection to common face surface 204A of first end cap 224A. The outer retainer sections 226A and 226B provide additional support for the end cap assembly 122. The outer retainer sections 226A and 226B have a tapered profile to mate with the profile of inner wall surfaces 230 (FIG. 5) of the outer rim section 128.

As can be appreciated from the foregoing, the switched reluctance motor according to the invention has improved torque density. For a given washing machine, the size of the motor can be reduced for a given torque output to provide additional clearance. As a result, the size of the inner and outer tubs can be increased, which increases the capacity of the washing machine. The stator segment assemblies in the motor can be produced with a greater electrical uniformity and with lower variations in inductance and resistance. Sensorless rotor position sensing techniques can be employed more successfully, which dramatically lowers the manufacturing costs of the washing machine and improves reliability in the field. Because the manufacturing tolerances of the stator segments have been improved, less costly drive circuits can be employed and/or more accurate control can be achieved. In addition, the end cap assemblies according to the invention prevent winding creep and further help improve uniformity of the stator segment assemblies during use.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A washing machine comprising:
a tub; and
a switched reluctance motor that rotates said tub, wherein said switched reluctance motor includes a stator including a plurality of circumferentially-spaced stator segment assemblies that include a stator segment core and winding wire wound around said stator segment core, a rotor that defines a plurality of rotor poles, wherein said rotor tends to rotate relative to said stator to maximize the inductance of an energized winding, and a drive circuit that energizes said winding wire around said stator segment assemblies based on a rotational position of said rotor.

2. The washing machine of claim 1 wherein said rotor is connected to a shaft that is connected to said tub.

3. The washing machine of claim 1 further comprising a drive assembly that includes a spinner pulley connected to said tub, wherein said spinner pulley is engaged by a belt that is driven by a shaft, and wherein said shaft is connected to said rotor.

4. The washing machine of claim 3 wherein said tub includes an outer tub and an inner tub that is mounted concentrically in said outer tub, wherein said spinner pulley is fixed for rotation with said inner tub.

5. The washing machine of claim 1 wherein an axis of rotation of said tub is substantially horizontal.

6. The washing machine of claim 1 wherein an axis of rotation of said tub is substantially vertical.

7. The washing machine of claim 1 wherein said stator segment core includes stator plates with a radially outer rim section and a tooth section that extends radially inwardly from a center portion of said radially outer rim section.

8. The washing machine of claim 7 further comprising:
an insulation layer located between said winding wire and said stator segment core.

9. The washing machine of claim 7 further comprising:
projections extending from opposite sides of a radially inner end of said tooth section.

10. The washing machine of claim 9 further comprising:
first and second end caps connected to opposite axial ends of said stator segment core; and
first and second end cap retainer sections that extend along said projections and that connect said first and second end caps,
wherein said first and second end caps and said first and second end cap retainer sections reduce movement of said winding wire during use.

11. The washing machine of claim 7 wherein said stator plates of said stator segment core include radial and lateral slits and first and second central portions that are deformed and wherein said stator plates are press fit to hold said stator segment core together.

12. The washing machine of claim 1 wherein said drive circuit senses rotor position using sensorless techniques.

13. A washing machine comprising:
a tub assembly including an inner tub that is mounted for rotation in an outer tub;
a switched reluctance motor that rotates at least one of said inner and outer tubs; and
a stator for said switched reluctance motor including a plurality of circumferentially-spaced stator segment assemblies that are arranged around an inner surface of a motor housing, each of said stators segment assemblies defining a salient stator pole that extends in a radially inward direction, wherein inter-polar stator slots are defined between adjacent stator segment assemblies, and said stator segment assemblies include a stator segment core and winding wire that is wound around said stator segment core.

14. The washing machine of claim 13 wherein said switched reluctance motor includes a rotor that is connected to a shaft, wherein said shaft is connected to at least one of said inner and outer tubs.

15. The washing machine of claim 13 wherein said switched reluctance motor includes a rotor that is connected to a drive assembly.

16. The washing machine of claim 15 wherein said drive assembly includes a shaft, a belt, and a spinner pulley that is connected to said tub assembly, wherein said spinner pulley is engaged by said belt that is driven by said shaft, and wherein said shaft is connected to said rotor.

17. The washing machine of claim 13 wherein an axis of rotation of said tub assembly is substantially vertical.

18. The washing machine of claim 13 wherein an axis of rotation of said tub assembly is substantially horizontal.

19. The washing machine of claim 13 wherein said stator segment core includes stator plates with a radially outer rim section and a tooth section that extends radially inwardly from a center portion of said radially outer rim section.

20. The washing machine of claim 19 further comprising:
an insulation layer located between said winding wire and said stator segment core.

21. The washing machine of claim 19 further comprising:
projections extending from opposite sides of a radially inner end of said tooth section.

22. The washing machine of claim 21 further comprising:
first and second end caps connected to opposite axial ends of said stator segment core; and
first and second end cap retainer sections that extend along said projections and that connect said first and second end caps,
wherein said first and second end caps and said first and second axial end cap retainer sections reduce movement of said winding wire during use.

23. The washing machine of claim 19 wherein said stator plates of said stator segment core include radial and lateral slits and first and second central portions that are deformed and wherein said stator plates are press fit to hold said stator segment core together.

24. A washing machine comprising:
a tub assembly including an inner tub that is mounted for rotation in an outer tub;
a drive assembly that includes a shaft, a spinner pulley, and a belt that is wound around said spinner pulley and that is rotated by said shaft, wherein said spinner pulley is fixed for rotation with said inner tub; and
a switched reluctance motor including a motor housing, a rotor that is connected to said shaft and that rotates relative to said motor housing, and a stator that is mounted on an inner surface of said motor housing, said stator including a plurality of circumferentially-spaced stator segment assemblies, wherein said stator segment assemblies include a stack of stator plates forming a stator segment core and winding wire that is wound around said stator segment core, wherein each of said stator plates has a generally "T"-shaped cross-section, a radially outer rim section, and a tooth section that extends radially inwardly from a center portion of said radially outer rim section.

25. The washing machine of claim 24 wherein an axis of rotation of said inner tub is substantially vertical.

26. The washing machine of claim 24 wherein an axis of rotation of said inner tub is substantially horizontal.

27. The washing machine of claim 24 further comprising:
an insulation layer located between said winding wire and said stator segment cores.

28. The washing machine of claim 24 further comprising:
projections extending from opposite sides of a radially inner end of said tooth section.

29. The washing machine of claim 28 further comprising:
first and second end caps connected to opposite axial ends of said stator segment core; and
first and second end cap retainer sections that extend along said projections and that connect said first and second end caps,
wherein said first and second end caps and said first and second end cap retainer sections reduce movement of said winding wire during use.

30. The washing machine of claim 24 wherein said stator plates of said stator segment core include radial and lateral slits and first and second central portions that are deformed and wherein said stator plates are press fit to hold said stator segment core together.

31. The washing machine of claim 24 further comprising:
a drive circuit connected to said winding wire of said stator segment assemblies, wherein said drive circuit senses rotor position using sensorless techniques.

* * * * *